(12) United States Patent
Sagawa

(10) Patent No.: US 7,817,338 B2
(45) Date of Patent: Oct. 19, 2010

(54) PROJECTOR SCREEN AND PROJECTOR

(75) Inventor: Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 11/832,227

(22) Filed: Aug. 1, 2007

(65) Prior Publication Data

US 2008/0074565 A1 Mar. 27, 2008

(30) Foreign Application Priority Data

Sep. 25, 2006 (JP) ............................. 2006-258928

(51) Int. Cl.
*G03B 21/56* (2006.01)
*G03B 21/60* (2006.01)
(52) U.S. Cl. ..................................... 359/443; 359/459
(58) Field of Classification Search ................. 359/449, 359/459, 443; 353/79
See application file for complete search history.

(56) References Cited

U.S. PATENT DOCUMENTS

| | | | | |
|---|---|---|---|---|
| 3,756,710 A | * | 9/1973 | Taylor ........................... | 353/43 |
| 4,059,351 A | * | 11/1977 | Wisotsky ...................... | 40/362 |
| 5,075,789 A | * | 12/1991 | Jones et al. .................... | 349/7 |
| 6,814,448 B2 | * | 11/2004 | Ioka ............................. | 353/69 |
| 7,604,357 B2 | * | 10/2009 | May et al. ..................... | 353/85 |
| 7,609,444 B2 | * | 10/2009 | Garner et al. ................ | 359/459 |
| 2004/0012849 A1 | * | 1/2004 | Cruz-Uribe et al. ......... | 359/449 |
| 2007/0091432 A1 | * | 4/2007 | Garner et al. ............... | 359/459 |

FOREIGN PATENT DOCUMENTS

| | | |
|---|---|---|
| JP | A 2003-121943 | 4/2003 |
| JP | A 2006-106689 | 4/2006 |

\* cited by examiner

*Primary Examiner*—Christopher Mahoney
(74) *Attorney, Agent, or Firm*—Oliff & Berridge, PLC

(57) ABSTRACT

A projector screen that is used together with a projector for protecting a moving image being a result of scanning output of a video signal, and displays the moving image by a projection light reaching thereto after being emitted when the projector projects the moving image, the projector screen includes: a screen member that configures a partition screen area being a part of a screen area of displaying the moving image partitioned to a plurality of rows, and is capable of mode change between a first mode of delivering the projection light having reached the partition screen area to a side of a viewer, and a second mode of not delivering the projection light having reached the partition screen area to the viewer; and mode changing means for moving, for the screen member of each of the rows of the screen area, by exercising control over each of the screen members in terms of mode change between the first and second modes, any of the partition screen areas put in the second mode in the screen area.

15 Claims, 9 Drawing Sheets

PROJECTOR SCREEN AND PROJECTOR

BACKGROUND

1. Technical Field

The present invention relates to a projector that projects moving images being a result of scanning output of a video signal, and a projector screen that displays thereon the moving images by passing through or reflecting projection lights to be emitted when the projector projects the moving images.

2. Related Art

A screen displays moving images being a result of a projector subjecting a video signal to scanning output, and for such a use, there have been various proposals for the aim of increasing the quality of display images. As an example, refer to Patent Document 1 (JP-A-2003-121943).

The screen described in Patent Document 1 indeed provides the quality increase for display images by preventing room lights from being reflected in the images with a variable reflection coefficient. However, the screen is not serving the need at all for controlling or eliminating any possible image blurring that is inherently observed during display of moving images. This image blurring occurs due to the characteristics of moving image display, i.e., frames each have a different image, and a viewer generally keeps looking at the sequence of image frames so that the moving images are perceived. When a viewer looks at such a sequence of image frames, due to the persistence of vision in his or her eye retina, one image looks overlapped with the subsequent image and thus the moving images look blurred, thereby causing blurring of the moving images. The quality degradation due to such blurring of the moving images is totally different from the quality degradation due to room lights reflected in the images. This is the reason why the screen of Patent Document 1 is not serving right to control or eliminate blurring of moving images.

Patent Document 2 (JP-A-2006-106689) also describes the technology of controlling or eliminating blurring of moving images on the side of a device for generating the moving images. With the technology of Patent Document 2, the phenomenon of persistence of vision is prevented by instantaneously displaying a black image of a signal at a fixed level, e.g., at a black level, in the sequence of image frames, thereby aiming to control or eliminate blurring of moving images. In Patent Document 2, although exemplified is a liquid crystal display device, the same is true for a projector in view of deriving moving images. Therefore, by utilizing the technology of Patent Document 2 for generating moving images in a projector, some effects are expected in terms of controlling or eliminating blurring of the moving images displayed by directing projection lights of the projector to a screen.

The issue here is that, in order to deal with any possible blurring of moving images on the side of any existing projector, there needs to establish a matching, in terms of circuit configuration, with other control devices in the projector for use for image generation, thereby requiring the extensive adaptations and circuit change to make. If with any projector recently appeared in the market, there also needs to make design change or facility change in consideration of preventing blurring of moving images.

SUMMARY

An advantage of some aspects of the invention is to provide a new technique of preventing blurring of moving images displayed on a screen by a projector and, more specifically, to a new screen capable of preventing such blurring of moving images.

According to an aspect of the invention, a projector screen is used together with a projector that projects moving images being a result of scanning output of a video signal, and displays the moving images by projection lights that are emitted when the projector projects the moving images. A screen area for displaying the moving images is partitioned into a plurality of rows, and the resulting partition screen areas are each configured by a screen member. The screen member is capable of mode change between a first mode of delivering the projection lights having reached the partition screen areas to the side of a viewer, and a second mode of not delivering the projection lights having reached the partition screen areas to the viewer, when the screen members are in the first mode, the partition screen areas each configured by a screen member accordingly display moving images after receiving the projection lights having reached the partition screen areas, and the viewer perceives the moving images via the screen members. The screen area being the assembly of the screen members collectively displays the moving images displayed in the partition screen areas of the screen members in the first mode, and the viewer perceives the resulting moving images. On the other hand, when the screen members are in the second mode, the protection lights having reached the partition screen areas each configured by a screen member is not delivered to the viewer. The viewer thus does not perceive the moving images of the projection lights having reached the partition screen areas.

The screen member of each of the rows of the screen area is out under the control of mode change between the first and second modes so that any of the partition screen areas in the second mode are moved in the screen area. As such, with the projector screen of the aspect of the invention, during the image projection on a frame basis as described above, while every frame image is made visually available for a viewed a part thereof is partially changed in position so that the part of the frame image is not perceived by a viewers Accordingly, with the projector screen of the aspect of the invention, the screen side can solely achieve the suppression of a phenomenon of persistence of vision of the viewer's retina by not allowing the viewer who is looking at the frame images to perceive some part of the frame improves. As such, the projector screen of the aspect of the invention is considered as a new screen capable of preventing blurring possibly occurred when moving images are projected, for display, on a screen by a projector. That is, when any quality increase is expected for display of moving Images by controlling or eliminating any possible blurring of the moving images, there is no more need for extensive adaptations and circuit change of any existing projector so that the display quality of moving images can be increased with ease. Moreover, there is no dependence on the mode on the side of the projector for generation of moving images and irradiation of projection lights, i.e., mode change between the first and second modes on the side of the screen Will do for the projection lights of the projector, and this favorably leads to the better general versatility.

In this case, when any partition screen areas in the second mode are moved in the screen area, the projector provides a signal indicating the state of scanning output of the video signal, and the signal is used as a basis to exercise mode change control over the screen members in a plurality of rows. The partition screen areas put in the second mode are to be moved in the screen area in synchronization with the scanning output of the video signal. This accordingly increases the effectiveness of suppressing the phenomenon of persistence of vision of a viewer's retina with no image display during the sequence of image display on a frame basis. This is considered preferable in view of increasing the display quality of moving images.

The screen member accomplishes the first mode by showing capabilities of light transmission or reflection, and accomplishes the second mode by showing capabilities of light absorption. In this manner, when the screen members are in the first mode, with the capabilities of light transmission or reflection, the projection lights coming from the projector are passed therethrough or reflected thereon. As a result, in the partition screen areas each configured by a screen member, the moving images for the areas are displayed, and in the screen area being the assembly of the screen members, the moving images from the projector are displayed in, its entirety. On the other hand, when the screen members are in the second mode, with the capabilities of light absorption, the projection lights from the projector are absorbed. Therefore, in the partition screen areas each configured by a screen member, no moving image is displayed. That is, by not displaying the moving images the viewer is not allowed to perceive the moving images.

The projector screen of the aspect of the invention can vary in type. For example, the screen member may include a liquid crystal cell that is shaped to match one of the partition screen areas configured by a screen member, and the mode changing means may change the mode of the liquid crystal cell between the first and second modes by changing the molecule orientation of a liquid crystal material through control over voltage application to the liquid crystal cell. If this is the configuration, by simply exercising voltage control over the liquid crystal cells, the display quality of moving images can be achieved with ease through suppression of a phenomenon of persistence of vision of the viewer's retina. For implementation of the first and second modes in the liquid crystal cells, if the molecule orientation is controlled for the liquid crystal cells to be in black or in almost black, the liquid crystal cells are to absorb the light so that the second mode is implemented. On the other hand, if the molecule orientation i s controlled for the liquid crystal cells to al low light transmission, the first mode of the capabilities of light transmission is implemented. If the molecule orientation is controlled for the liquid crystal cells to be in white, for example, the first mode of the capabilities of light reflection is implemented.

The projector may include a reflective mirror that reflects the projection lights that are emitted when the projector projects the moving images, and the screen area may be disposed opposing the reflective mirror to accept a reflected light of the reflective mirror, thereby implementing the first mode for each of the screen members in a plurality of rows with the capabilities of light transmission. With such a configuration, an optical path for the protection lights from the projector to the screen members in a plurality of rows can be bent while being ensured with the length thereof. This enables to dispose the screen members closer to the projector, thereby achieving space saving.

In this case, the reflective mirror can be disposed on the rear surface side of a cabinet, and the screen area can be disposed opposing the reflective mirror on the front surface side of the cabinet by disposing the screen members in a plurality of rows on the front surface side of the cabinet. With such a configuration, the optical path for the projection lights from the projector to the screen members in a plurality of rows is enclosed by the cabinet, and this accordingly protects the optical path for the projection lights from any illumination lights. This is considered preferable in view of keeping the brightness. What is better, the positional relationship between the reflective mirror and the screen area is fixed by the cabinet, and thus the focusing is simplified and the handling is also eased.

According to another aspect of the invention, a projector screen is used together with a projector for projecting moving images being a result of scanning output of a video signal, and the moving images are displayed using a reflective mirror, i.e., the reflective mirror reflects projection lights that are emitted when the projector protects the moving images, and the reflective lights are allowed to reach a light-through screen board that is disposed opposing the reflective mirror. The reflected lights reached the screen board as such are passed through so that the moving images are displayed. A reflection surface area for the projection lights in the reflective mirror is partitioned into a plurality of rows, and the resulting partition reflection surface areas are each configured by a reflection surface member. This reflection member can be changed in mode between the first mode of showing the capabilities of light reflection and the second mode of showing the capabilities of light absorption. Therefore, when the reflection surface members are In the first mode, with the capabilities of light reflection, the projection lights from the projector are reflected and are allowed to reach the screen board. As such, in the area of the screen board accepting the projection lights reflected by the reflection surface area configured by the reflection surface members, the moving images corresponding to the area are displayed, and in the reflection surface area being the assembly of the reflect ion surface members, the moving images from the projector are displayed ill its entirety. On the other hand, when the reflection surface members are in the second mode, with the capabilities of light absorption, the projector absorbs the projection lights. Therefore, the projection lights are not reflected in the partition reflection surface areas each configured by a reflection surface member so that no moving image is displayed in the area of the screen board corresponding to the partition reflection surface areas.

For each of the reflection surface members in a plurality of rows occupying the reflection surface area, by changing the mode of the reflection surface members between the first and second modes, the partition reflection surface areas put in the second mode are moved in the reflection surface area. Accordingly, even with the screen of this aspect of the invention, as already described, the screen side can solely achieve the suppression of a phenomenon of persistence of vision of a viewer's retina by keeping some images out of the viewer's view during the sequence of frame images. As a result, also with the projector screen of this aspect of the invention, the effects as described above can be also achieved.

Also with the projector screen of this aspect of the invention, similarly to the projector screens of other aspects of the invention described above, in synchronization with the scanning output of a video signal from the projector, the partition reflection surface areas in the second mode can be moved in the reflection surface area, or the liquid crystal cells can be used, for example.

Other than these, the invention is applicable to a projector being a piece with a screen via a cabinet, and one embodiment includes a so-called rear projector in which a cabinet including a projector is provided with a reflective mirror on the rear surface side, and a screen on the front surface side.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, embodiments of the Invention are described in the following sequence based on the properties of screens.

A: First Embodiment for Reflective Screen;
B: Second Embodiment for Reflective Screen;
C: Embodiment for Light-through Screen; and
D: Another Embodiment for Reflective Screen

A: First Embodiment for Reflective Screen

Figure 1:
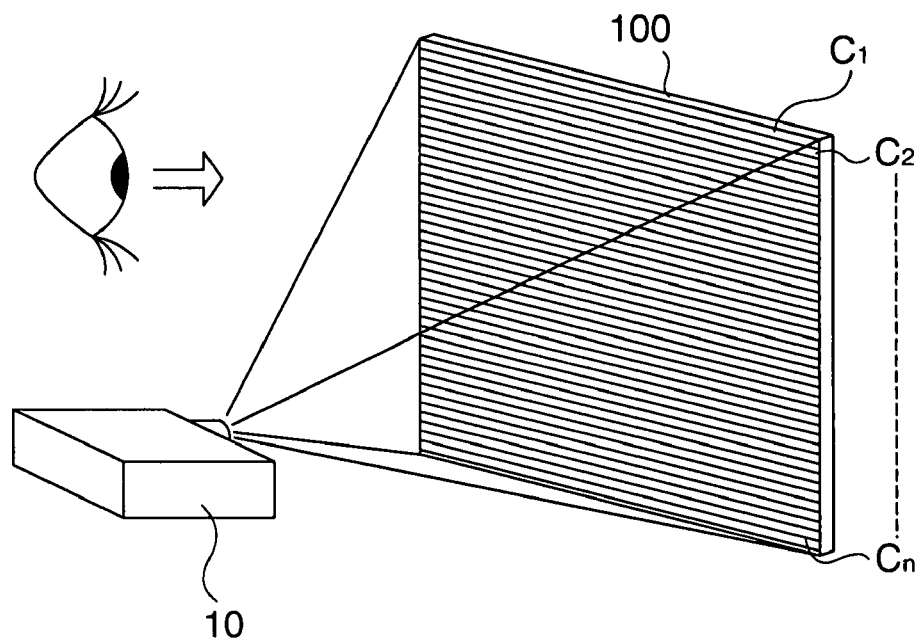
FIG. 1 is a diagram showing a reflective screen 100 and a projector 10 for image projection onto the screen in a first embodiment of the invention.
Figure 2:
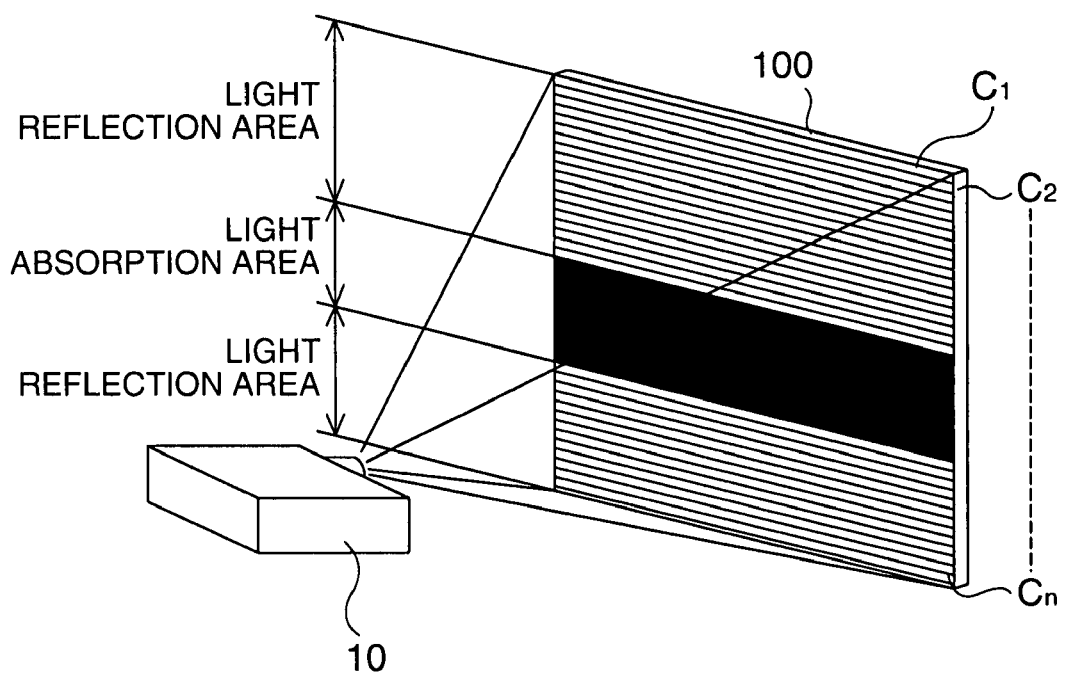
FIG. 2 is a diagram for illustrating the reflective screen 100 in the state of use, i.e., moving images are projected thereon.
Figure 3:
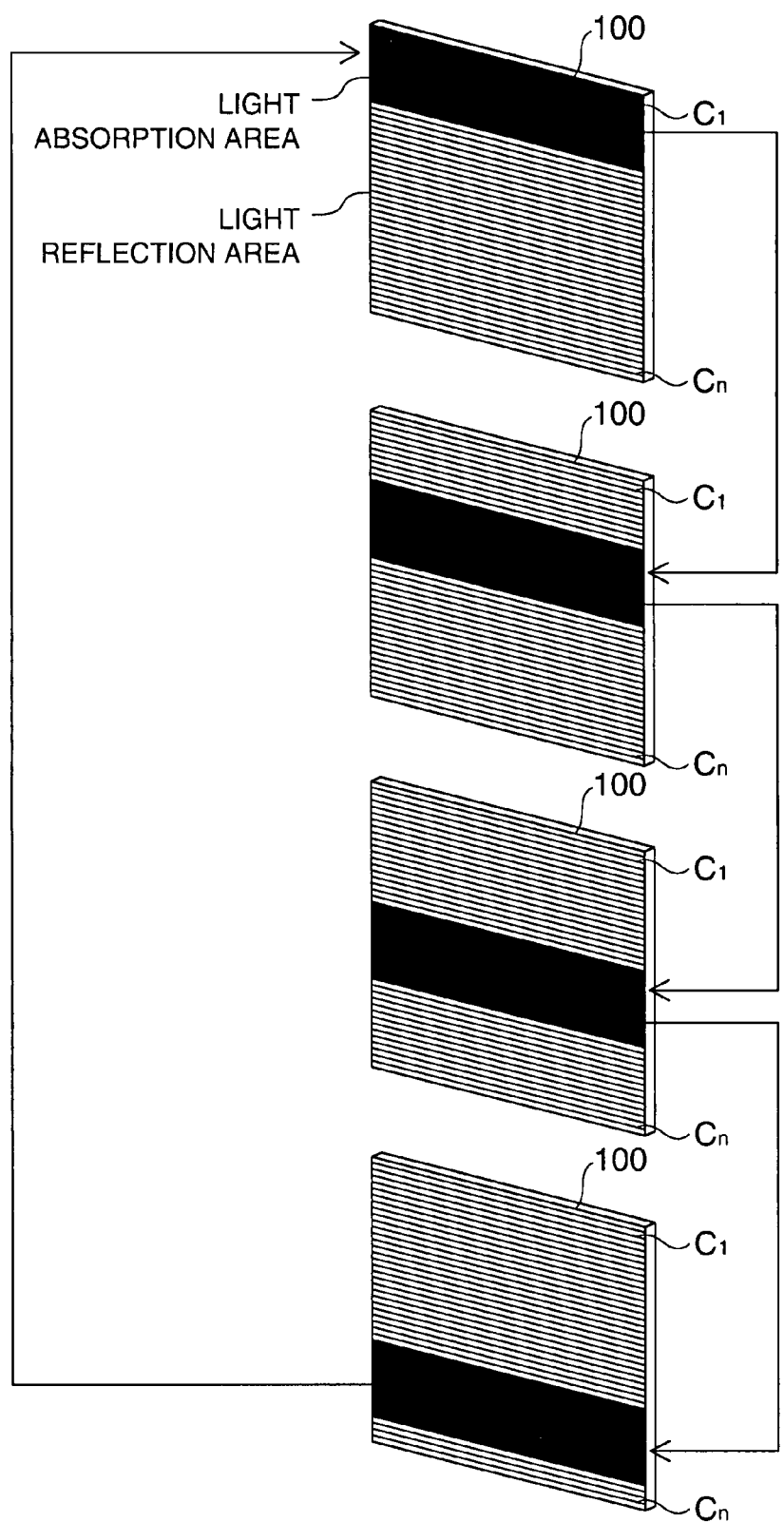
FIG. 3 is a diagram showing the reflective screen 100 in the state of use.

FIG. 1 is a diagram showing a reflective screen 100 and a projector 10 for image projection onto the screen in a first embodiment of the invention. FIG. 2 is a diagram for illustrating the reflective screen 100 in the state of use, i.e., moving images are projected thereon. FIG. 3 is a diagram showing the reflective screen 100 in the state of use.

As shown in FIG. 1, the projector 10 is disposed opposing the reflective screen 100. The projector 10 is so configured as to project moving images being a result of scanning output of a video signal. For projection of the moving images, the projector 10 directs projection lights to the reflective screen 100. The reflective screen 100 displays thereon the moving images by the projection lights having reached thereto, and makes the projector lights of the moving images to reflect toward a viewer who is looking at the reflective screen 100 from the side of the projector 10 so that the displayed moving images become visually available for the viewer.

As shown in the drawing, the reflective screen 100 is partitioned into a plurality of rows in the vertical direction, and the resulting partitioned portions are referred to as reflective liquid crystal cells C1 to Cn, respectively. The liquid crystal cells C1 to Cn are each shaped like a horizontally-long band, and are so configured as to exert two types of performance capabilities when the molecule orientation is changed in a liquid crystal material filled in the reflective screen 100. The performance capabilities include light reflection capabilities of reflecting lights having reached the surfaces of the liquid crystal cells, and light absorption capabilities of absorbing the lights having reached the surfaces of the liquid crystal cells. That is, when showing the light reflection capabilities, the liquid crystal cells C1 to Cn are put in a first mode, and are put in a second mode when showing the light absorption capabilities. In the first mode, the projection lights of the projector 10 having reached the reflective screen 100 are delivered to the side of a viewer, and in the second mode, the projection lights are not delivered to the side of the viewer. To make the liquid crystal cells C1 to Cn to show the light absorption capabilities, the molecule orientation is changed in a liquid crystal material filled in the reflective screen 100 to prevent the lights from passing through the liquid crystal cells. This accordingly turns the color of the liquid crystal cells into black or almost black, and thus the lights having reached the liquid crystal cells are absorbed. When the liquid crystal cells C1 to Cn are showing the light reflection capabilities and thus are in the first mode, on the other hand, this turns the color of the liquid crystal cells C1 to Cn into white for easy reflection on the liquid crystal cells. The liquid crystal cells C1 to Cn on the side of the projector 10 are each provided with, on the surface, a transmissive light scattering plate to make moving images visually available for a viewer by displaying those with the light reflection capabilities of the first mode. With the scattering of reflected lights on the light scattering plate, the moving images of the projection lights are to be formed (displayed) on the surfaces of the liquid crystal cells.

As described above, the reflective screen 100 of the embodiment is an assembly of the band-shaped liquid crystal cells C1 to Cn arranged one on the other in the vertical direction. These liquid crystal cells C1 to Cn can be individually changed in molecule orientation. Accordingly, during display of moving images with the projection lights of the projector 10 directed to the reflective screen 100, as shown in FIG. 2, the reflective screen 100 is partitioned into light reflection areas and light absorption areas. In the light reflection area, the liquid crystal cells in the first mode are sequentially arranged, and in the light absorption area, the liquid crystal cells sequentially arranged are those in the second mode. With such a configuration, in the reflective screen 100, the light reflection areas display thereon the moving images of the projection lights from the projector 10, and the light absorption areas display no such moving images.

The liquid crystal cells C1 to Cn configuring the reflective screen 100 can be individually changed in mode between the first and second modes. Therefore, as show in FIG. 3, the light absorption area in which the liquid crystal cells in the second mode are sequentially arranged is allowed to move in the reflective screen 100, from the upper end side to the lower end side. The light absorption area moving as shun is the area of displaying no moving image because the liquid crystal cells therein are those in the second mode. The remaining area in the reflective screen 100, i.e., the light reflection area, is the area of displaying the moving images of the projection lights of the projector 10. It means that the area of displaying no moving image moves up and down, and at the same time, the remaining area displays thereon the moving images. That is the screen area being available for display of moving images is scanned while the light absorption area moves, and the screen area serves as the light absorption area in its entirety.

Figure 4:
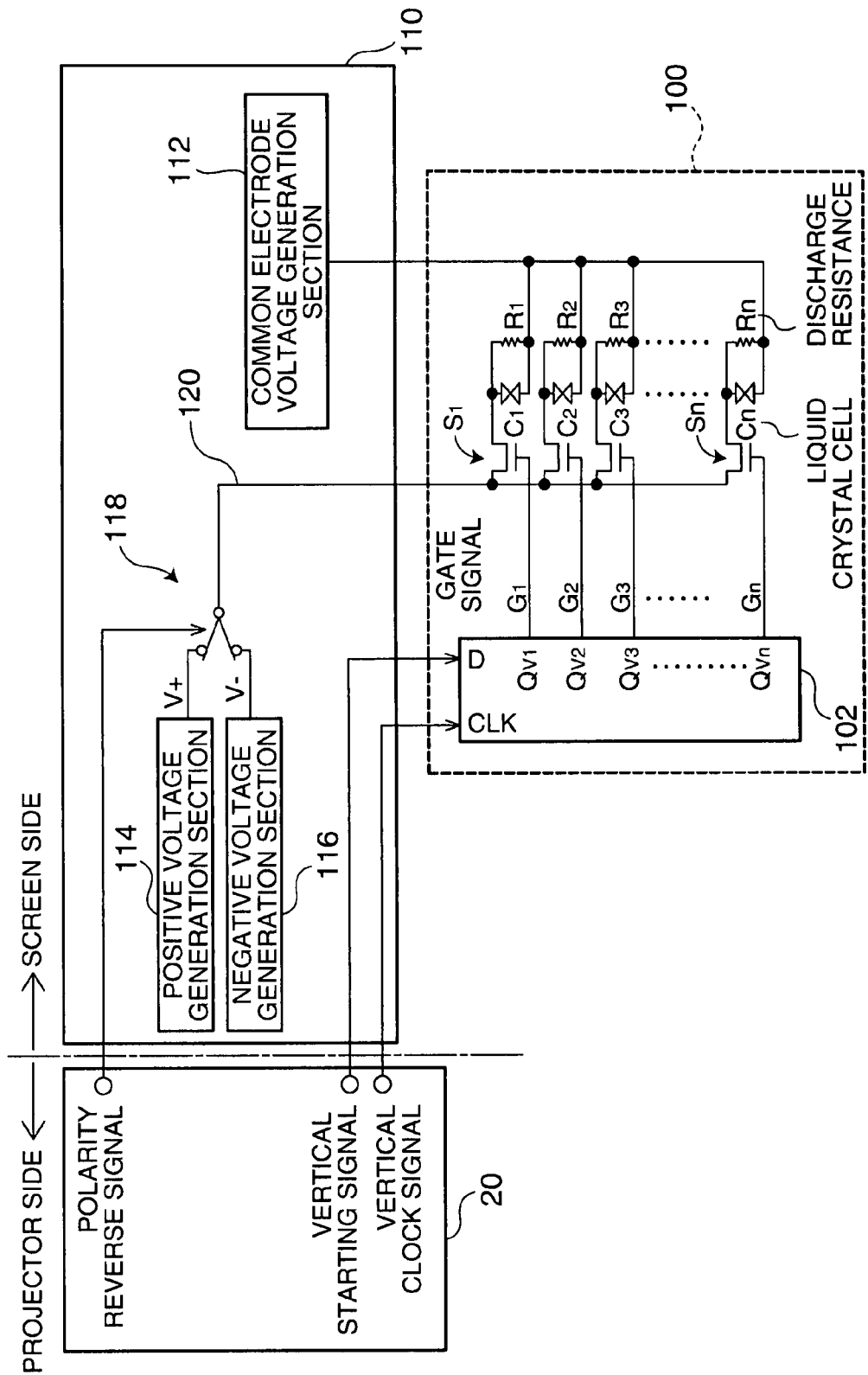
FIG. 4 is a block diagram showing the schematic electrical configuration of the reflective screen 100.
Figure 5:
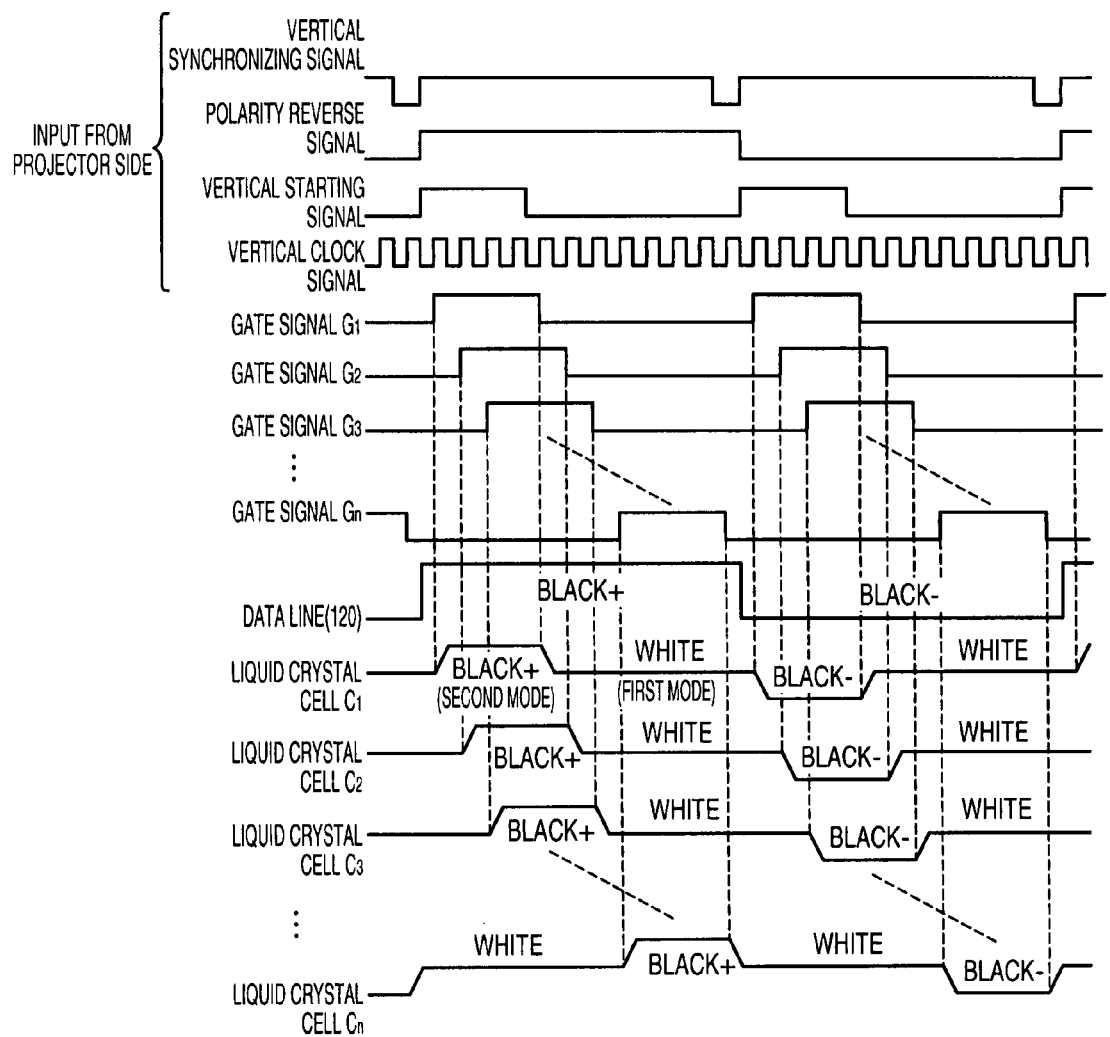
FIG. 5 is a timing chart of control application over liquid crystal cells C1 to Cn of the reflective screen 100.

Described next is the electrical configuration of the reflective screen 100 described above. FIG. 4 is a block diagram showing the schematic electrical configuration of the reflective screen 100. FIG. 5 is a timing chart of control application over the liquid crystal cells C1 to Cn of the reflective screen 100.

The reflective screen 100 is configured to include a control section 110 for voltage application control over the liquid crystal cells C1 to Cn. This control section 110 is disposed on the rear surface of the reflective screen 100, and is configured to include a column electrode voltage generation section 112, a positive voltage generation section 114, a negative voltage generation section 116, and a switching element 118. The common electrode voltage generation section 112 is so configured as to generate an electrode voltage For application to the liquid crystal cells configuring the reflective screen 100, and is connected to the liquid crystal cells C1 to Cn. For this connection, discharge resistances R1 to Rn are included. The switching element 118 receives a polarity inversion signal, from a control device 20 equipped in the projector 10, and changes a connection target for a data line 120 from/to the positive voltage generation section 114 to/from the negative voltage generation section 116. The data line 120 is being connected to the liquid crystal cells C1 to Cn via switch elements S1 to Sn, e.g., TFT devices, respectively. As such, in response to the polarity inversion on the side of the projector 10 during video signal processing, the potential polarity of the liquid crystal cells C1 to Cn is reversed from/to positive to/from negative.

The reflective screen 100 is configured to include a line selection circuit 102. This line selection circuit 102 is of a configuration that selects the liquid crystal cells in the second mode, as described above, from the liquid crystal cells C1 to Cn being the partitioned portions of the reflective screen 100. That is, the line selection circuit 102 is configured to serve as a shift register, and receives a vertical starting signal and a vertical clock signal from the control device 20 of the projector 10. In synchronization with these signals, the line selection circuit 102 outputs, on a liquid crystal cell basis, gate signals G1 to Gn to the switch elements S1 to Sn at output terminals Qv1 to Qvn corresponding to the liquid crystal cells, respectively. After receiving the gate signals as such, the liquid crystal cells change their molecule orientation, and go into the above-described second mode. This will be described by referring to FIG. 5.

The control device 20 of the projector 10 generates moving images frame by frame for projection on the reflective screen 100. This image generation is carried out in an image display device (not shown), e.g., liquid crystal panel, provided in the projector by subjecting a video signal to scanning output. After image generation as such, the image display device is exposed to a light directed from a light source, thereby projecting, by projection lights, the resulting moving images in the image display device on the reflective screen 100 frame by frame. At the same time as generation of moving images as such, as shown in FIG. 5, the control device 20 generates and outputs a vertical synchronizing signal, a polarity inversion signal, a vertical starting signal, and a vertical clock signal matching the image generation timing on a frame basis.

The line selection circuit 102 of the reflective screen 100 receives the vertical starting signal and the vertical clock signal, and in synchronization with these signals, sequentially provides the gate signals G1 to Gn to the liquid crystal cells as shown in FIG. 5. In response, the gate signal G1 is turned ON in synchronization with the vertical starting signal, and over the predetermined number of clocks, the gate signal G1 remained turned ON in synchronization with the vertical clock signal, and then is turned OFF. As a result, the liquid crystal cell C1 located at the top of the reflective screen 100 starts showing the light absorption capabilities, and thus goes into the second mode. The liquid crystal cells C2 to Cn then also go into the second mode in order. In FIG. 5, the liquid crystal cells put in the second mode are each denoted as black, and the liquid crystal cells not in the second mode, e., in the first mode with the light reflection capabilities, are each denoted as white. Note here that the signs of + and − next to the word of "black" represents that the polarity of the data line 120 is changed from/to positive to/from negative in response to the polarity inversion signal, i.e., "black+" denotes that the liquid crystal cell is changed in molecule orientation in response to application of any positive voltage generated by the positive voltage generation section 114 and showing the light absorption capabilities, and "black−" denotes that the liquid crystal cell is changed in molecule orientation in response to application of any negative voltage generated by the negative voltage generation section 116 and showing the light absorption capabilities.

Between any adjacent liquid crystal cells, the periods when gate signals are turned ON are overlapped each other, and thus as shown in FIG. 2, a light absorption area of a predetermined width is formed by these adjacent liquid crystal cells being in the second mode. This light absorption area is moved from up to down of the reflective screen 100 as shown in FIG. 3 because the liquid crystal cells whose gate signals are sequentially turned ON are disposed one on below the other.

The projector 10 subjects a video signal to scanning output in synchronization with the vertical starting signal and the vertical clock signal, and separately from the above-described movement of the light absorption area in the reflective screen 100, goes through generation of moving images and projection thereof, i.e., generates moving images on a frame basis for projection onto the reflective screen 100, and projects the resulting frame-basis moving images onto the reflective screen 100 with projection lights. In the reflective screen 100, however, the movement of the light absorption area is carried out at the timing matching the projection of the frame-basis moving images. This timing matching is achieved by mode change of the liquid crystal cells C1 to Cn in synchronization with the vertical starting signal and the vertical clock signal described above. Exemplified here is a specific case for description, i.e., frame images are to be generated by subjecting an m-row video signal to scanning output in the projector 10. In this case, in the projector 10, frame images are generated by this m-row video signal being subjected to scanning output from the first row to the m-th row in order, and the resulting images are projected onto the reflective screen 100. At the same time, in the reflective screen 100, a light absorption area is moved from up to down. As such, while the frame images are being projected onto the reflective screen 100, the light absorption area is moved while displaying no image, and the remaining light reflection area displays thereon the frame images. The display of images, i.e., display of frame images, in the light reflection area is performed in the image display area not including the light absorption area moving as such, but because the light absorption area moves as described above, the frame images are entirely displayed for a viewer to perceive.

As described in the foregoing, with the reflective screen 100 of this embodiment, during the image projection by the projector 10 with respect to the reflective screen 100 frame by frame, every frame image is made visually available for a viewer but a part thereof is partially changed in position with the movement of the light absorption section so that the part of the frame image is not perceived by the viewer. Accordingly, separately from scanning output of a video signal on the side of the projector 10 and screen projection by projection lights of the resulting moving images, the side of the reflective screen 100 of this embodiment can solely achieve the suppression of a phenomenon of persistence of vision by making some part of the frame images not visually available for a viewer who is looking at the sequence of the frame images. Therefore, the reflective screen 100 of this embodiment s considered as a new screen capable of preventing blurring possible occurred when moving images are projected thereon, for display, by the projector 10. That is, when any quality increase is expected for display of moving images by controlling or eliminating any possible blurring observed in the moving images, there is no more need for extensive adaptations and circuit change of any existing projector. Accordingly, even if any existing projector is used, the quality increase can be achieved with ease for display of moving images. Moreover, there is no dependence on the mode on the side of the projector for generation of moving images and irradiation of projection lights, i.e., mode change between the first and second modes on the side of the reflective screen 100 will do for the projection lights of the projector, and this favorably leads to the better general versatility.

What is better, in the embodiment, when a light absorption area configured by any adjacent liquid crystal cells in the second mode is moved in the screen area of the reflective screen 100, this movement is made in synchronization with the scanning output of a video signal after the mode change control exercised over a plurality of rows of the liquid crystal cells C1 to Cn between the first and second modes. This control application is based on the signal inputs from the projector 10, i.e., the vertical synchronizing signal, the vertical starting signal, and the vertical clock signal. This accordingly increases the effectiveness of suppressing the phenomenon of persistence of vision by displaying no image between frames in the image sequence, and this is considered effective in view of increasing the display quality of moving images.

In the configuration of the reflective screen 100, the screen area thereof is the assembly of the liquid crystal cells C1 to an each shaped like a band to match the shape of a plurality of portions partitioned in the vertical direction. The liquid crystal cells C1 to Cn are changed in their molecule orientation through control over voltage application so that the liquid crystal cells C1 to Cn are changed in mode between the first and second modes. As such, with such simple voltage control applied over the liquid crystal, cells C1 to Cn, the display quality of moving images can be achieved with ease by suppressing a phenomenon of persistence of vision, and it is thus considered preferable.

B: Second Embodiment for Reflective Screen

Figure 6:
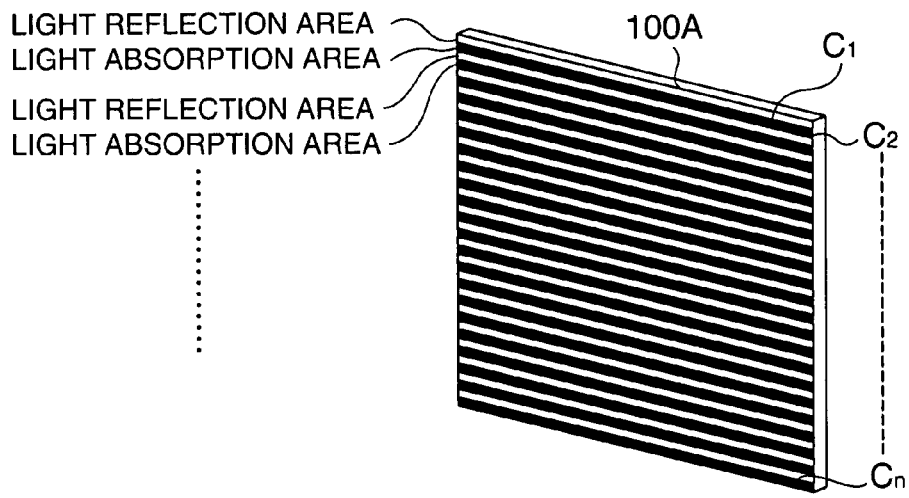
FIG. 6 is a diagram showing a reflective screen 100A in a second embodiment of the invention, and how a light reflection area and a light absorption area are implemented in the reflective screen 100A.
Figure 7:
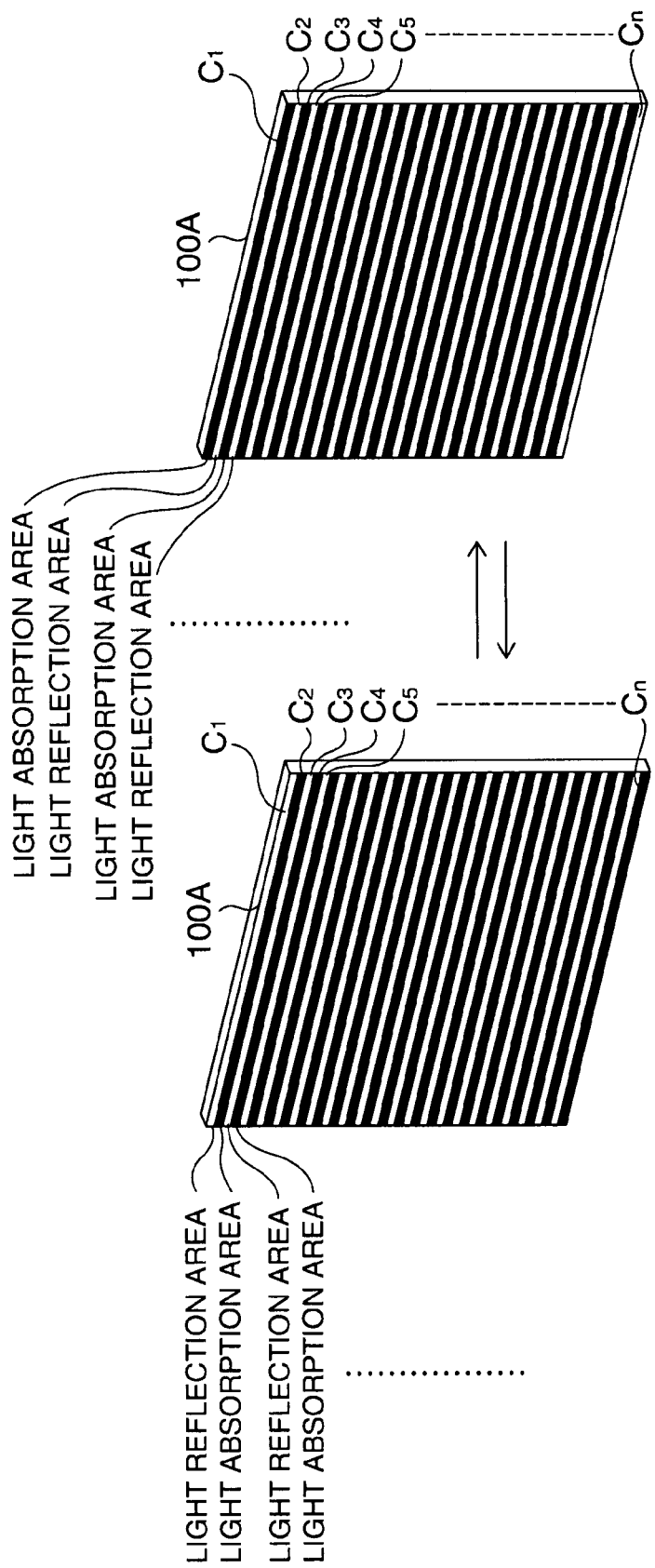
FIG. 7 is a diagram showing the reflective screen 100A in the state of use.

FIG. 6 is a diagram of a reflective screen 100A, as a second embodiment for the reflective screen, showing how a light reflection area and a light absorption area are implemented in the reflective screen 100A. FIG. 7 is a diagram showing the reflective screen 100A in the state of use.

As described above by referring to FIG. 1, the reflective screen 100A of FIG. 6 is also disposed opposing the projector 10 for use, displays thereon moving Images with reflection of projection lights having reached from the projector 10, and makes the displayed moving images visually available for a viewer. Similarly to the reflective screen 100 described above, this reflective screen 100A is partitioned into a plurality of rows in the vertical direction, and the partitioned portions are referred to as band-shaped reflective liquid crystal cells C1 to Cn (where n is a positive integer) respectively.

With the reflective screen 100A, the liquid crystal cells C1 to Cn are individually changed in mode between the first and second modes, and this is the same as the reflective screen 100 described above. The difference therebetween lies in how a light absorption area is formed by the liquid crystal cells in the second mode, and how the light absorption area moves. That is, as shown in FIG. 6, when this reflective screen 100A is in use, the liquid crystal cells are alternately set in the first and second modes, i.e., the liquid crystal cell C1 at the top end of the screen is set in the first mode, and the cell therebelow is set in the second mode, and this goes down to the liquid crystal cell Cn at the bottom end of the screen. With such mode setting, a light reflection area and a light absorption area appear alternately in the screen area. In the reflective screen 100A, the state of screen in the left side drawing of FIG. 7 is changed to/from the state of screen in the right side drawing of FIG. 7 at a timing that will be described later. In the state of screen in the left side drawing of FIG. 7, the liquid crystal cells C1 to Cn are disposed in alternate order of the liquid reflection area, i.e., in the first mode, and the light absorption area, i.e., in the second mode. In the state of screen in the right side drawing of FIG. 7, the liquid crystal cells C1 to Cn are disposed in alternate order of the light absorption area, i.e. in the second mode, and the liquid reflection area, i.e., in the first mode. This area change is made by mode change between the first and second modes. With such an area change, the light absorption areas of displaying no moving image are moved in the reflective screen 100A as will be described later.

Assumed now is a case where the reflective screen 100A is in the state of the left side drawing of FIG. 7. In this case, the liquid crystal cells C1 to Cn are disposed in order of the light reflection area, i.e., in the first mode, and the light absorption area, i.e., in the second mode. With such a configuration, the light absorption areas occupy a half of the screen area, and are each a cell area of a liquid crystal cell in the second mode. If with mode change in the reflective screen 100A for the liquid crystal cells as described above, the liquid crystal cells having been served as the light reflection areas, i.e., in the first mode, before the mode change are turned to be the light absorption areas, i.e., go in the second mode. As such, in response to such mode change, the light absorption areas are moved by a cell area of a liquid crystal cell. With another mode change in the reflective screen 100A for the liquid crystal cells, the light absorption areas are moved again by a cell area of a liquid crystal cell, i.e., the screen area having been served as the display area for the moving images is partitioned into cell areas of liquid crystal cells, and in the state, starts serving as the light absorption areas in the entire screen area in response to the movement, by a cell area, of the light absorption areas occupying a half of the screen area.

Figure 8:
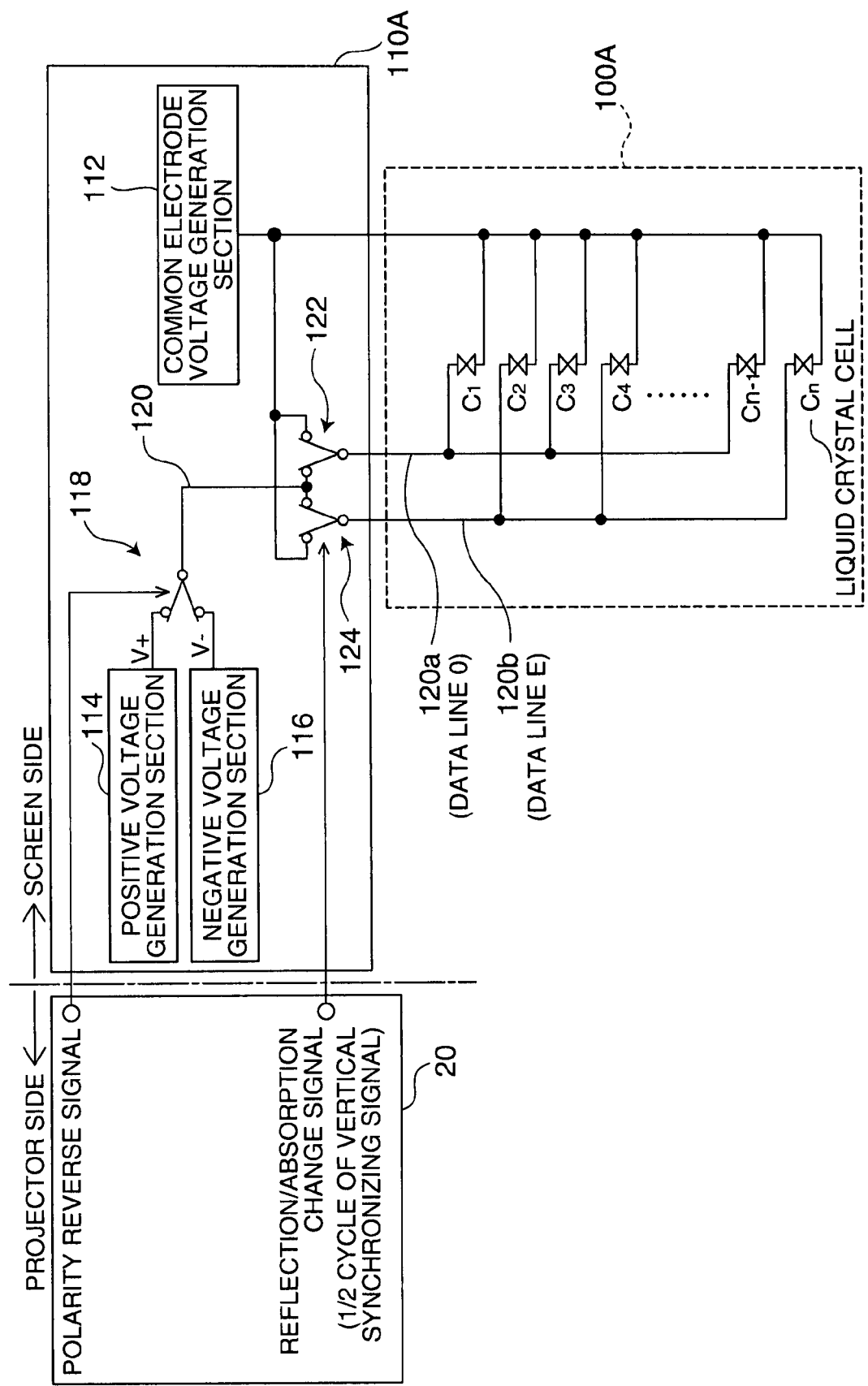
FIG. 8 is a block diagram schematically showing the electrical configuration of the reflective screen 100A.
Figure 9:
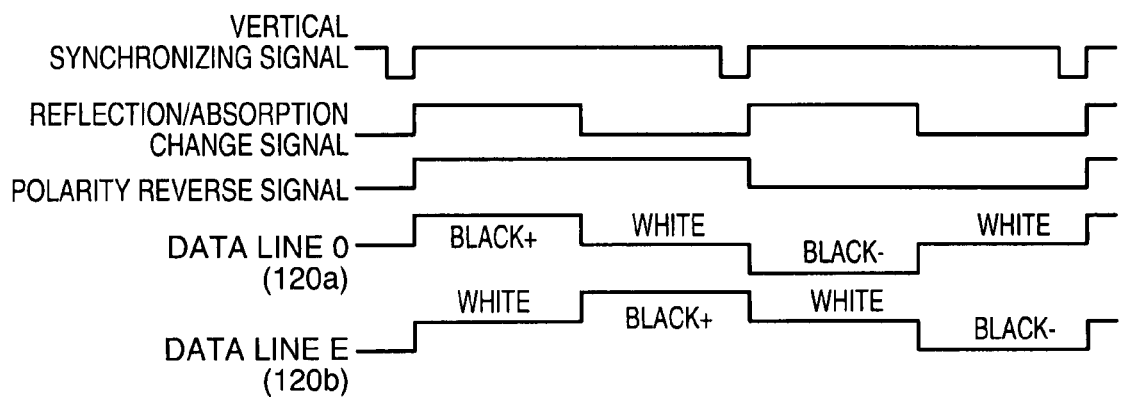
FIG. 9 is a timing chart of control application over liquid crystal cells C1 to Cn of tie reflective screen 100A.

Described next is the electrical configuration of the reflective screen 100A described above. FIG. 8 is a block diagram schematically showing the electrical configuration of the reflective screen 10A. FIG. 9 is a timing chart of control application over the liquid crystal cells C1 to Cn of the reflective screen 100A.

With the reflective screen 100A, for mode change for the liquid crystal cells, the liquid crystal cells C1 to Cn disposed in rows one on the other in the vertical direction are classified into a group of those in the odd rows and a group of those in the even rows. The liquid crystal cells in the odd rows are then connected to a first data line 120a, i.e., data line 0, and the liquid crystal cells in the even rows are connected to a second data line 120b, i.e., data line E, so that the liquid crystal cells are connected to the common electrode voltage generation section 119 of the control section 110A on a group basis. The data line 120 is connected to the positive and negative voltage generation sections 114 and 116 via the switching element 118, and is also connected to the first and second data lines 120a and 120b via switching elements 122 and 124, respectively. These switching elements 122 and 124 are individually turned on and off in response to a reflection/absorption change signal coming from the control device 20 of the projector 10, thereby alternately changing the mode, i.e., between the first and second modes, of the liquid crystal cells on a group basis, i.e., the group of the liquid crystal cells in odd rows, and the group of those in even rows. As a result of such mode change, as described above, polarity inversion is observed via the switching element 118.

Described next is such mode change in the reflective screen 100A for the liquid crystal cells with a correlation with the electrical configuration thereof. The control device 20 of the projector 10 generates and outputs a polarity inversion signal and a reflection/absorption change signal to a control section 100A of the reflective screen 100A during image generation and projection on a frame basis as described above. In this case, because the movement of the light absorption area in the reflective screen 100A is carried out by a half of the screen area, as shown in FIG. 9, the reflection/absorption change signal is of a half cycle of the vertical synchronizing signal, which is matching the image generation timing on a frame basis.

This reflection/absorption change signal alternately changes the mode of, via the switching elements 122 and 124, the group of the liquid crystal cells in odd rows and the group of those in even rows between the first and second modes. As a result of such mode change made to the liquid crystal cells on a group basis as shown in FIG. 7, in the reflective screen 103A, the light reflection area is moved in the screen area on a cell area basis of liquid crystal cells by a half of the screen area. Because the reflection/absorption change signal is of a half cycle of the vertical synchronizing signal, the mode change, i.e., the movement of the light absorption area, is applied in synchronization with the vertical synchronizing signal.

As such, with mode change for the liquid crystal cells C1 to Cn also in the reflective screen 100A based on the group of the liquid crystal cells, i.e., the group of those in odd rows and the group of those in even rows, the movement of the light absorption area is made synchronous with the projection of moving images on a frame basis on the side of the reflective screen 100A. Accordingly, similarly to the reflective screen 100, also in the reflective screen 100A, while the projector 10 projecting the images frame by frame, every frame image is made visually available for a viewer but a part (a half) thereof is changed in position with the movement of the light absorption section so that the art of the frame image is not perceived by the viewer. Therefore, the reflective screen 100A of this embodiment is also considered as a new screen capable of preventing blurring possible occurred when moving images are projected, for display, by the projector 10, and can achieve the effects described above.

C: Embodiment for Light-Through Screen

Figure 10:
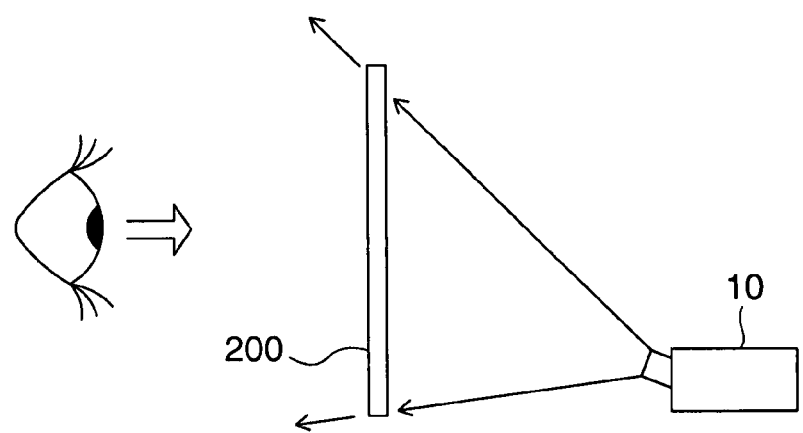
FIG. 10 is a diagram showing a light-through screen 200 and the projector 10 for use for image projection thereonto.
Figure 11:
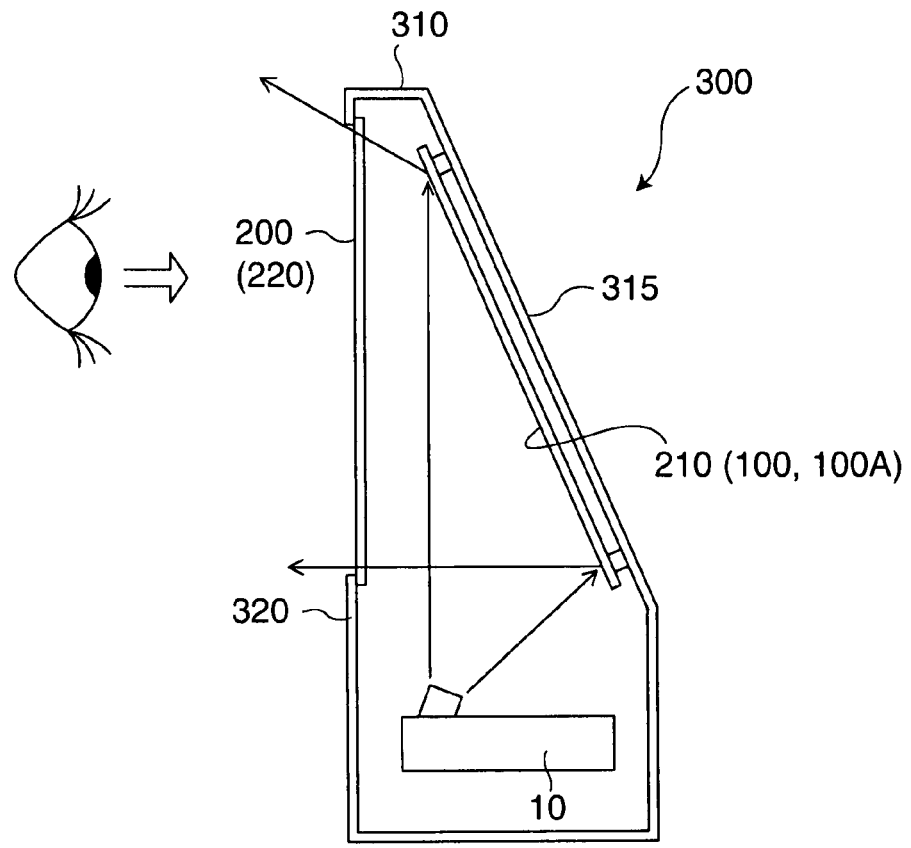
FIG. 11 is a diagram showing the schematic configuration of a rear projector 300 in which a cabinet includes the light-through screen 200 and the projector 10.
Figure 12:
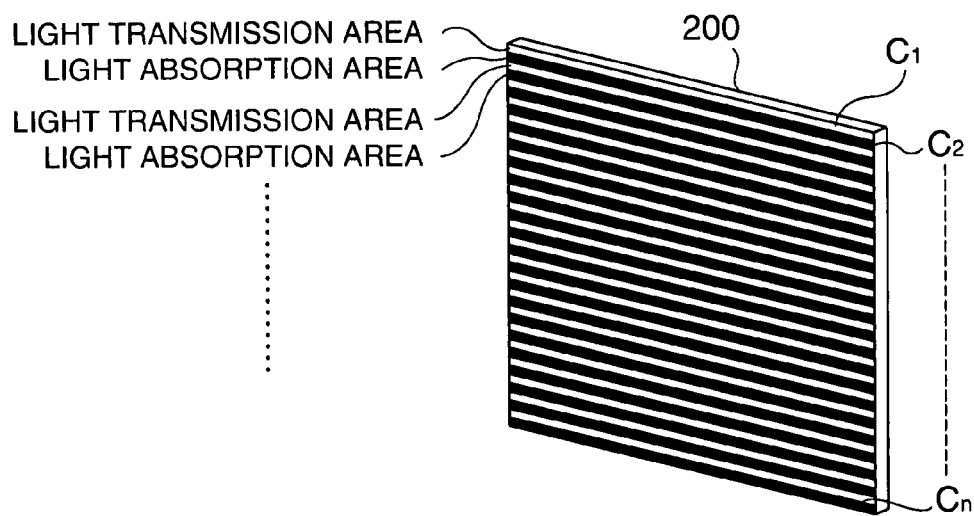
FIG. 12 is a diagram showing the light-through screen 200, and how a light transmission area and a light absorption area are implemented in the light-through screen 200.
Figure 13:
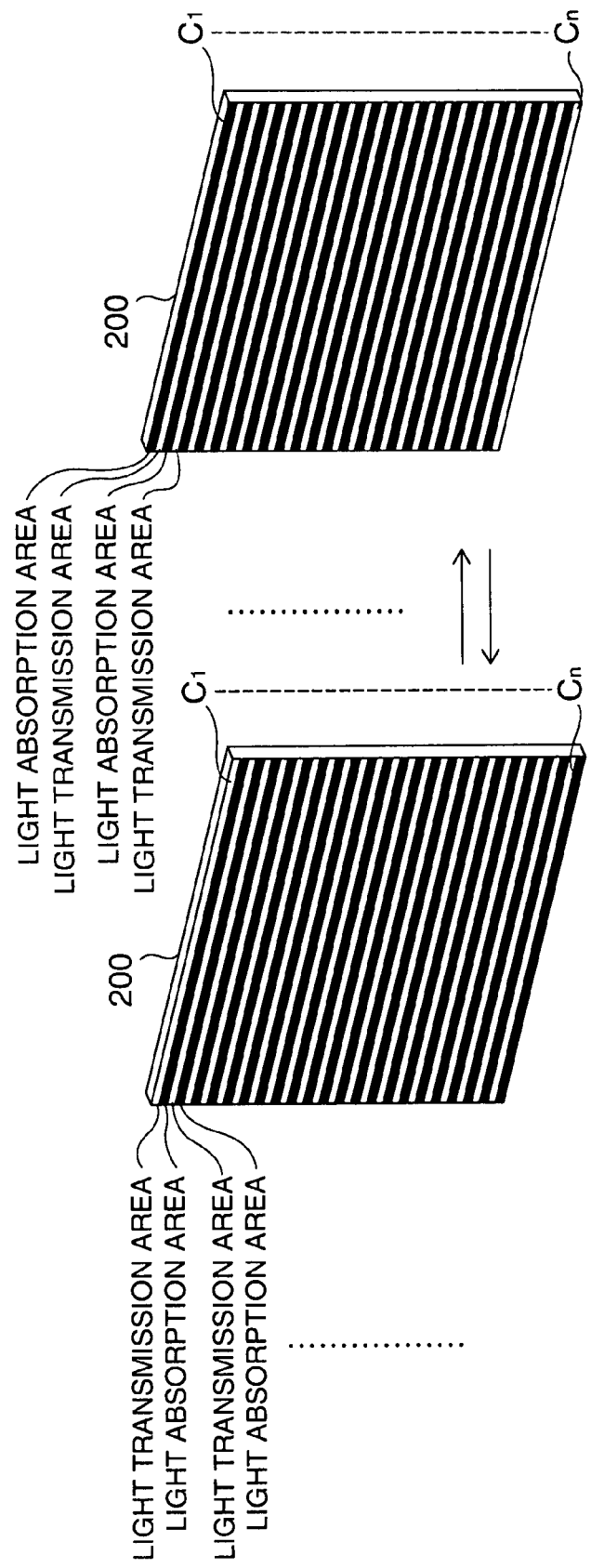
FIG. 13 is a diagram showing the light-through screen 200 in the state of use.

Described next is an embodiment in which moving images from a projector are displayed on a light-through screen to make those visually available for a viewer. FIG. 10 is a diagram showing both a light-through screen 200 and the projector 10 for use for image projection thereonto. FIG. 11 is a diagram showing the schematic configuration of a rear projector 300 in which a cabinet includes the light-through screen 200 and the projector 10. FIG. 12 is a diagram showing the light-through screen 200, and how a light transmission area and a light absorption area are implemented in the light-through screen 200. FIG. 13 is a diagram showing the light-through screen 200 in the state of use.

The light-through screen 200 of FIG. 10 is disposed opposing the projector 10, and passes through projection lights from the projector 10 to the side of a viewer being positioned against the projector 10 with the screen therebetween so that moving images become visually available for the viewer. The viewer thus perceives the images formed on the surface of the light-through screen 200, i.e., the light-through surface of light. The light-through screen 200 is thus provided with a transmissive light scattering plate on the side of the light-through surface to form, i.e., display, the moving images of the projection lights utilizing the light scattering on the light scattering plate.

With the rear projector 300 of FIG. 11, the light-through screen 200 is the same but the placement thereof with respect to the projector 10 is different, i.e., a reflective mirror 210 is disposed on the side of a tilted rear surface 315 of a cabinet 310 for reflecting projection lights from the projector 10, and the light-through screen 200 is disposed on the side of a front surface 320 of the cabinet 310 so that the light-through screen 200 is disposed opposing the reflective mirror 210. Accordingly, with the rear projector 300 of FIG. 11, the projection lights from the projector 10 are completely reflected by the reflective mirror 210, and the reflected lights are directed to the light-through screen 200 so that the moving images are displayed on the screen. As such, the lights (reflected light) are passed through to the side of a viewer positioned in front of the screen so that the moving images are visually available for the viewer. Also in this case, the light-through screen 200 forms, i.e., displays the moving images of the projection lights utilizing the light scattering on the transmissive light scattering plate on the side of the light-through surface.

The light-through screen 230 of FIGS. 10 and 11 is the same as the above-described reflective screen 100 in the respect that it is partitioned into a plurality of liquid crystal cells in rows in the vertical direction. The liquid crystal cells C1 to Cn of FIG. 12 are so configured as to exert two types of performance capabilities when the molecule orientation is changed in a liquid crystal material filled in the light-through screen 200. The performance capabilities include light transmission capabilities of passing through lights having reached the surfaces of the liquid crystal cells, and light absorption capabilities of absorbing the lights having reached the liquid crystal cells. That miss when showing the light transmission capabilities, the liquid crystal cells C1 to Cn are put in a first mode, and are put in a second mode when showing the light absorption capabilities. In the first mode, the projection lights of the projector 10 having reached the light-through screen 200 are delivered to the side of a viewer, and in the second mode, the projection lights are not delivered to the side of the viewer. With the liquid crystal cells C1 to Cn becoming non-transmissive, the color of the liquid crystal cells goes into black or almost black, and thus the lights having reached the liquid crystal cells are absorbed.

With this light-through screen 200, similarly to the reflective screen 100A described above, the liquid crystal cells are alternately set in the first and second modes. As shown in FIG. 12, a light transmission area and a light absorption area appear alternately in the screen area. The light-through screen 200 shares the same electrical configuration and manner of mode change control of the liquid crystal cells C1 to Cn as the reflective screen 100A, and the state of screen in the left side drawing of FIG. 13 is changed to/from the state of screen in the right side drawing of FIG. 13. In the state of screen in the left side drawing of FIG. 13, the liquid crystal cells C1 to Cn are disposed in alternate order of the light transmission area, i.e., in the first mode, and the light absorption area, i.e., in the second mode. In the state of screen in the right side drawing of FIG. 13, the liquid crystal cells C1 to Cn are disposed in alternate order of the light absorption area, i.e., in the second mode, and the light transmission area, i.e., in the first mode. In this case, the difference between the light-through screen 200 and the reflective screen 100A lies only in that the liquid crystal cells in the first mode will reflect or pass through lights due to the difference of the liquid crystal configuration, i.e., light-through or reflective. The light absorption area of displaying no moving image is still moved in the screen in response to any mode change made to the liquid crystal cells.

As such, also in the light-through screen 200, the liquid crystal cells C1 to Cn are subjected to mode change on a group basis, i.e., the group of the liquid crystal cells in odd rows and the group of those in even rows, in the manner similar to the reflective screens 100 and 100A, and the movement of a light absorption area is synchronized with the projection of moving images on a frame basis on the side of the reflective screen 100A. This thus leads to the same effects as described above also with the light-through screen 200.

D: Another Embodiment for Reflective Screen

Described next is another embodiment of using the reflective screens 100 and 100A for display of moving images. In this embodiment, similarly to the rear projector 300 of FIG. 11, a viewer sees moving images of lights after passing through the screen, and using the above-described reflective screens 100 and 100A is the characteristics. That is, in FIG. 11, the reflective mirror 210 disposed on the side of the tilted rear surface 315 of the cabinet 310 serves as the reflective screen 100 or 100A. With such a configuration, the light-through screen 200 disposed on the side of the front surface 320 of the cabinet 310 is used as a light-through screen board 220.

With this projector, the projection lights from the projector 10 are reflected on the liquid crystal cells of the reflective screen 100 or 100A, and the reflected lights are directed to the light-through screen board 220 for display of the moving images on the screen board. As such, the lights, i.e., reflected lights, are passed through the side of a viewer being in front of the screen so that the viewer perceives the moving images. In this case, the light-through screen board 220 forms, i.e., displays, the moving images of projection lights by the light scattering of a transmissive light scattering plate on the light-through surface side. That is, the projector configured as such is of the same cabinet configuration as the rear projector 300 using the reflective screen 100 or 100A. With such a projector, the light absorption area appears or moves in the manner as described above for the reflective screen 190 or 100 A when the projection lights are reflected by the reflective screen 100 or 100A thereby before reaching the screen board 220. As such, the effects as described above can be achieved.

While the invention has been described n detail, the foregoing description is in all aspects illustrative and not restrictive. It is understood that numerous other modifications and variations can be devised without departing from the scope of the invention. In the above embodiments, the reflective screen or the light-through screen is exemplarily partitioned by a plurality of band-shaped liquid crystal cells in the vertical direction, but this is surely not restrictive. Alternatively, in the embodiments of changing modes of the liquid crystal cells as described by referring to FIGS. 6 to 13 alternately between the first and second modes, the reflective screen or the light-through screen may be partitioned in lines by disposing band-shaped liquid crystal cells in the vertical direction or in the diagonal direction.

Moreover, in the embodiments, for the aim of synchronizing the movement of a light absorption area with the scanning output of a video signal in the projector 10, the control device 20 of the projector 10 forwards a vertical synchronizing signal, a polarity inversion signal, a vertical starting signal, and a vertical clock signal. Alternatively, a splitter (splitting circuit) is provided to the reflective screen 100 for equivalent splitting of a video signal for input to the projector 10 at the time of projection of moving images. From a video signal being the result of splitting as such, scanning state signals indicating the state of scanning output are created, i.e., a vertical synchronizing signal, a polarity inversion signal, a vertical starting signal, and a vertical clock signal. Based on these signals, the liquid crystal cells may be changed in mode between the first and second modes.

The entire disclosure of Japanese Patent Application No. 2006-258928, filed Sep. 25, 2006 is expressly incorporated by reference herein.

What is claimed is:

1. A projector screen that is used together with an LCD projector for projecting a moving image being a result of scanning output of a video signal, and displays the moving image by a projection light reaching thereto after being emitted when the projector projects the moving image, the projector screen comprising:

a screen member that configures a partition screen area being a part of a screen area of displaying the moving image partitioned into a plurality of rows, and is capable of mode change between a first mode of delivering the projection light having reached the partition screen area to a side of a viewer, and a second mode of not delivering the projection light having reached the partition screen area to the viewer; and mode changing means for moving, for the screen member of each of the rows of the screen area, by controlling each of the screen members so as to change a mode between the first and second modes, any of the partition screen areas changed to the second mode in the screen area.

2. The projector screen according to claim 1, wherein the mode changing means receives an input of a scanning state signal from the projector indicating a state of the scanning output of the video signal, or creates the scanning state signal indicating the state of the scanning output from a partial video signal being a result of equivalent splitting of the video signal provided to the projector, controls the screen members of the rows by changing the mode based on the scanning state signal, and moves any of the partition screen areas changed to the second mode in the screen area in synchronization with the scanning output of the video signal.

3. The projector screen according to claim 1, wherein the screen member accomplishes the first mode by light transmission or light reflection, and accomplishes the second mode by light absorption.

4. The projector screen according to claim 3, wherein the screen member includes a liquid crystal cell that is shaped to match one of the partition screen areas configured by the screen member, and the mode changing means changes the mode between the first and second modes for the liquid crystal cell by controlling a voltage applied to the liquid crystal cell and changing a molecule orientation of a liquid crystal material.

5. The projector screen according to claim 1, wherein
the projector includes a reflective mirror that reflects the projection light to be emitted when the projector projects the moving image,
the screen area is opposing the reflective mirror to accept a reflected light of the reflective mirror, and
each of the screen members of the rows implements the first mode by light transmission.

6. The projector screen according to claim 5, comprising:
a cabinet, wherein the reflective mirror is disposed on a rear side of the cabinet, and
the screen area is disposed on a front side of the cabinet so as to oppose the reflective mirror by disposing the screen members of the rows on the front side of the cabinet.

7. A projection system, comprising:
a projector that projects a moving image being a result of scanning output of a video signal; and
the projector screen of claim 1 that displays the moving image by receiving a projection light that is emitted when the projector projects the moving image.

8. The projector screen according to claim 1, wherein the partition screen areas in the first mode are interlaced with the partition screen areas in the second mode.

9. The projector screen according to claim 1, wherein the partition screen areas changed to the second mode are moved in synch with the a vertical synchronization signal.

10. The projector screen according to claim 1, wherein the partition reflection surface areas changed to the second mode are moved in synch with the a vertical synchronization signal.

11. A projector screen that is used together with an LCD projector for projecting a moving image being a result of scanning output of a video signal, comprising:
a reflective mirror that reflects a projection light being emitted when the projector projects the moving image;
a light-through screen board that is disposed opposing the reflective mirror to accept a reflected light of the reflective mirror, and displays the moving image by passing through the reflected light;
a reflection surface member that configures a partition reflection surface area being a part of a reflection surface area partitioned into a plurality of rows for the reflective mirror, and can change a mode between a first mode of delivering the projection light having reached the reflection surface to the light-through screen board by light reflection and a second mode of not delivering the projection light having reached the reflection surface to the light-through screen board by light absorption; and
mode changing means for moving, for the reflection surface member of each of the rows of the reflection surface area, by controlling each of the reflection surface members so as to change the mode between the first and second modes, any of the partition reflection surface areas changed to the second mode in the reflection surface area.

12. The projector screen according to claim 11, wherein
the mode changing means receives an input of a scanning state signal from the projector indicating a state of the scanning output of the video signal, or creates the scanning state signal indicating the state of the scanning output from a partial video signal being a result of equivalent splitting of the video signal provided to the projector,
controls the reflection surface members of the rows for the reflective mirror so as to change the mode based on the scanning state signal, and
moves any of the partition reflection screen areas changed to the second mode in the reflection surface area in synchronization with the scanning output of the video signal.

13. The projector screen according to claim 11, wherein
the reflection surface member includes a liquid crystal cell that is shaped to match one of the partition screen areas configured by the screen member, and
the mode changing means changes the mode between the first and second modes for the liquid crystal cell by controlling a voltage applied to the liquid crystal cell and changing a molecule orientation of a liquid crystal material.

14. The projector screen according to claim 11, comprising:
a cabinet, wherein the reflective mirror is disposed on a rear side of the cabinet, and
the screen board is disposed on a front side of the cabinet so as to oppose the reflective mirror.

15. The projector screen according to claim 11, wherein the partition reflection surface areas in the first mode are interlaced with the partition screen areas in the second mode.

* * * * *